United States Patent
Homa et al.

(10) Patent No.: US 8,942,527 B2
(45) Date of Patent: Jan. 27, 2015

(54) EXTENDED TEMPERATURE FIBER OPTIC CABLE DESIGN

(75) Inventors: Daniel S. Homa, Blacksburg, VA (US); Robert M. Harman, Troutville, VA (US); Christopher H. Lambert, Christiansburg, VA (US)

(73) Assignee: Baker Hughes Incorporated, Houston, TX (US)

( * ) Notice: Subject to any disclaimer, the term of this patent is extended or adjusted under 35 U.S.C. 154(b) by 696 days.

(21) Appl. No.: 13/053,851

(22) Filed: Mar. 22, 2011

(65) Prior Publication Data

US 2012/0243881 A1  Sep. 27, 2012

(51) Int. Cl.
*G02B 6/44* (2006.01)
*H04B 10/25* (2013.01)

(52) U.S. Cl.
CPC ............................. *H04B 10/25* (2013.01)
USPC ............................................. 385/109

(58) Field of Classification Search
None
See application file for complete search history.

(56) References Cited

U.S. PATENT DOCUMENTS

| 4,181,397 A | 1/1980 | Baker et al. |
| 6,404,961 B1 | 6/2002 | Bonja et al. |
| 2002/0126969 A1 | 9/2002 | Bonja et al. |
| 2005/0236161 A1 | 10/2005 | Gay et al. |
| 2010/0232753 A1* | 9/2010 | Parris et al. .......... 385/109 |

FOREIGN PATENT DOCUMENTS

| JP | 04295810 A | 10/1992 |
| KR | 1020050114029 A | 12/2005 |

OTHER PUBLICATIONS

Internaional Search Report and Written Opinion, Date of Mailing Sep. 21, 2012, International Application No. PCT/US2012/026948, Korean Intellectual Property Office, Written Opinion 5 pages, International Search Report 3 pages.

* cited by examiner

*Primary Examiner* — Jerry Rahll
(74) *Attorney, Agent, or Firm* — Cantor Colburn LLP

(57) ABSTRACT

A fiber optic cable for use in a downhole environment is disclosed. The fiber optic cable includes a tube having an interior region; an optical fiber disposed in the interior region of the tube; a gas in the interior region; and a gel in the interior region, wherein the gel is configured to reduce stress on the optical fiber in the presence of the gas at a temperature substantially near the flashpoint of the gel. One or more seals can be used to seal the gel and the inert gas in the interior region. In various aspects, the fiber optic cable can be used in a downhole environment.

19 Claims, 11 Drawing Sheets

EXTENDED TEMPERATURE FIBER OPTIC CABLE DESIGN

BACKGROUND

Various downhole drilling and completion processes employ fiber optic cables to provide transmission of optical signals between a surface location and a downhole location. Most fiber optic cables used downhole include an optical fiber encased within a tube. Shear forces between the tube and the optical fiber and other stresses can affect the efficiency of light transmission through the optical fiber. Therefore, a viscous gel is generally applied between the optical fiber and the tube in order to protect the fiber from environmental concerns, to prevent damage from microbending conditions and to help reduce the forces applied during spooling and deployment. The viscous gel thereby reduces non-target stresses on the optical fiber. Unfortunately, these gels can oxidize at temperatures experienced in dowhole environments. Furthermore, the downhole temperatures can exceed the gel flashpoint, thereby limiting the usefulness of fiber optic cables downhole. The present disclosure provides a method and apparatus for providing optical transmission over a gel filled fiber optic cable with reduced strain at downhole temperatures.

SUMMARY

In one aspect, the present disclosure provides a fiber optic cable including a tube having an interior region; an optical fiber disposed in the interior region of the tube; a gas in the interior region; and a gel in the interior region, wherein the gel is configured to reduce stress on the optical fiber in the presence of the gas at a temperature substantially near a flashpoint of the gel.

In another aspect, the present disclosure provides a method of transmitting a signal in a downhole environment, the method including: providing a fiber optic cable formed by disposing an optical fiber in an interior region of a tube, providing a gas in the interior region, and providing a gel in the interior region to reduce stress on the optical fiber in the presence of the gas at a temperature substantially near a flashpoint of the gel; disposing the fiber optic cable in the downhole environment at a temperature greater than a service temperature of the gel; and transmitting the signal over the optical fiber.

In another aspect, the present disclosure provides an apparatus for transmitting a signal in a downhole environment, the apparatus including: a fiber optic cable disposed in the downhole environment and including a tube having an interior region, an optical fiber disposed in the interior region of the tube, a gas in the interior region, and a gel in the interior region, the gel configured to reduce a stress on the optical fiber in the presence of the gas at a temperature substantially near a flashpoint of the gel; and a transmitter coupled to a first end of the fiber optic cable configured to transmit a signal into the optical fiber.

In another aspect, the present disclosure provides a method of producing a fiber optic cable for use in a downhole environment, the method including: providing a tube having an interior region; disposing an optical fiber in the interior region of the tube; filling the interior region with an inert gas; and displacing a selected volume of the inert gas from the interior region with a gel configured to reduce stress on the optical fiber in the presence of the inert gas at a temperature substantially near a flashpoint of the gel.

In yet another aspect, the present disclosure provides a fiber optic cable for use in a downhole environment, including: a tube having an interior region; an optical fiber disposed in the interior region of the tube; an inert gas in the interior region configured to extend a lifetime of the optical fiber coating and/or optical fiber.

BRIEF DESCRIPTION OF THE DRAWINGS

For detailed understanding of the present disclosure, references should be made to the following detailed description, taken in conjunction with the accompanying drawings, in which like elements have been given like numerals and wherein.

DETAILED DESCRIPTION

Figure 1:
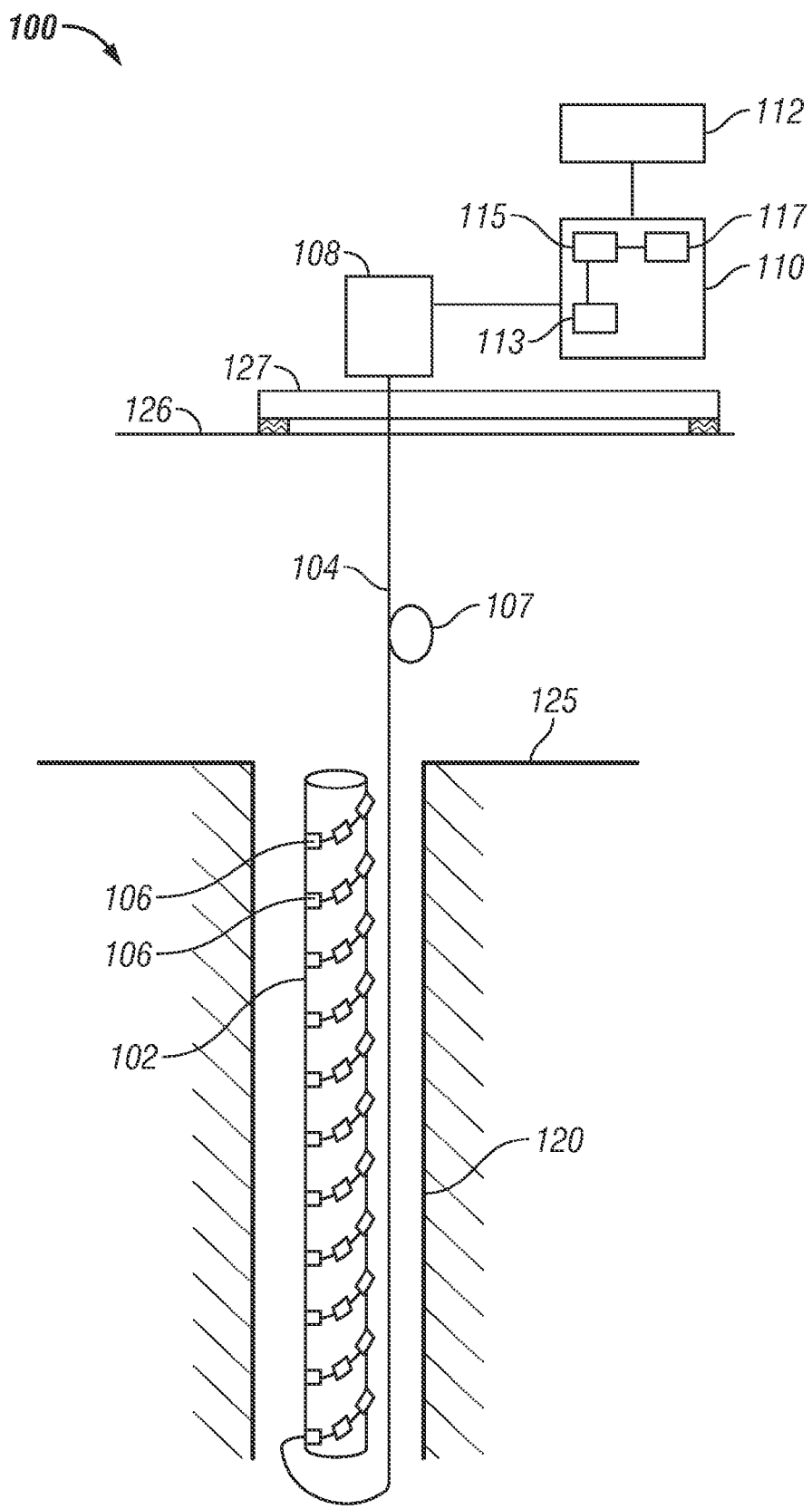
FIG. 1 shows an exemplary oil production system suitable for using the exemplary methods and apparatus described herein.

FIG. 1 shows an exemplary oil production system 100 suitable for using the exemplary methods and apparatus described herein. The exemplary production system 100 of FIG. 1 includes a tubular 102 in wellbore 120 in optical communication with surface electronics via fiber optic cable 104. Fiber optic cable 104 can include a plurality of sensors 106 and can be constructed and deployed using the exemplary methods disclosed herein. Each of the plurality of sensors 106 is configured to provide an optical signal upon interaction with a light propagating in the fiber optic cable 104. The fiber optic cable 104 is wrapped around the surface of the tubular 102 and each of the plurality of sensors 106 is thereby attached at a particular location to tubular 102. A change in a parameter, such as strain or temperature, at the particular location is therefore detected by the sensor attached at or near the particular location, which thus provides a signal corresponding to the detected change in parameter. These signals can be processed at surface electronics to obtain the parameter such as, for example, a strain, a temperature or a deformation of the tubular.

Fiber optic cable 104 is coupled at the surface location to an interrogation unit 108. The interrogation unit 108 can include a light source (not shown), typically a laser for providing light to the sensors via fiber optic cable 104, and circuitry for obtaining signals resulting from interaction of the light with the plurality of sensors 106. Interrogation unit 108 can be coupled to a data processing unit 110 and in one aspect transmits obtained signals to the data processing unit. In one aspect, the data processing unit 110 receives and processes the measured signals from the interrogation unit 108 to obtain a parameter, such as a measurement of wavelength, strain or temperature at the tubular. In various aspects, data processing unit 110 includes at least one memory 115 having various programs and data stored therein, a computer or processor 113 accessible to the memory and configured to access one or more of the programs and/or data stored therein to obtain the parameter, and a recording medium 117 for recording and storing the obtained parameter. The data processing unit 110 can output the parameter to various devices, such as a display 112 or the recording medium 117.

The exemplary fiber optic cable disclosed herein is described with respect to a production system 100 in FIG. 1. The exemplary production system 100 is a sub-sea oil production system including sensors at a tubular 102 at a sea bottom location 125 in communication with surface electronics (i.e., interrogation unit 108) located at a sea platform 127 at sea level 126. In addition, the fiber optic cable can be used with a system deployed at a land location. Other systems suitable for using the fiber optic cable disclosed herein can include an oil exploration system, an oil production system, a measurement-while-drilling tool, and a wireline logging device, among others. In particular, the fiber optic cable disclosed herein can be used to propagate signals related to such processes as Real Time Compaction Monitoring (RTCM), Distributed Temperature Sensing (DTS), optical frequency domain reflectometry (OFDR), Extrinsic Fabry-Perot Interferometry (EFPI), and telemetry, for example.

Figure 2A:
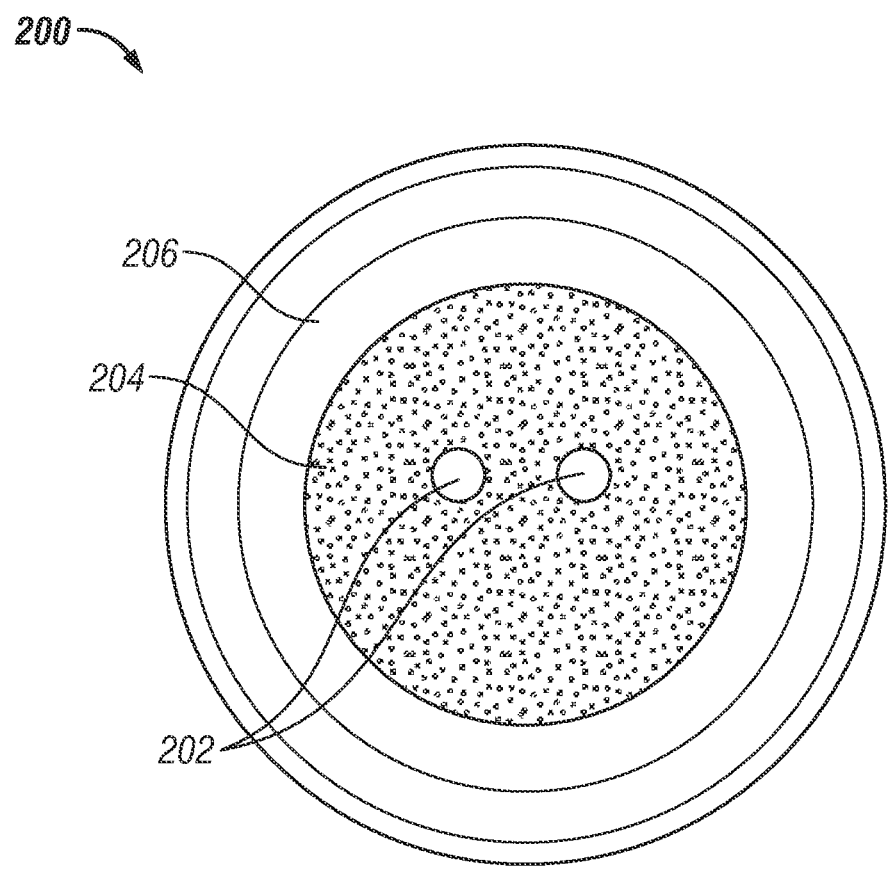
FIGS. 2A-B show cross-sections of exemplary fiber optic cables of the present disclosure.

FIG. 2A shows a cross-section of an exemplary fiber optic cable of the present disclosure. Fiber optic cable 200 includes a tube 206 having an interior region 204 through which one or more optical fibers 202 are provided. In various embodiments, the tube can be made of stainless steel 316, stainless steel 304, Alloy 825, Alloy 625 or other common downhole metals or metal alloys. The tube typically has a larger thermal expansion (~5-20 ppm/C) than the optical fiber, typically a fused silica optical fiber (~0.55 ppm/C). Thus, when deployed and used at high temperatures, the metal tube expands more than the optical fiber and exerts stresses on the optical fiber, which can ultimately cause the fiber to break and cause a system failure. A common practice is to manufacture an excess fiber length (EFL) in the metal tube to account for the differences in thermal expansion. EFL is defined by the percentage of excess fiber loaded into the metal tube during construction to relieve induced stresses directly related to the differing thermal coefficient of expansions of each material of the fiber optic cable. In addition, shear stress can be caused by normal motion of the optical fiber with respect to the tube during implementation and use. These stresses can affect the quality of signals propagating through the optical fiber, cause signal attenuation, or result in residual strain. To reduce stress and therefore maintain signal quality, a gel fills the interior region 204 and couples the tube 206 to the one or more optical fibers 202. Typically, the gel is a thixotropic gel that is viscous under normal conditions, but becomes less viscous over time when stressed. Thixotropic gel provides a freedom of motion (i.e., slip) of the one or more optical fibers 202 with respect to tube 206 and thereby protects the one or more optical fibers from stresses and maintains signal quality. Exemplary thixotropic gels can be silicone based or hydrocarbon based. An inert gas and/or a mostly inert gas is introduced into the interior region 204 alongside the gel.

Figure 2B:
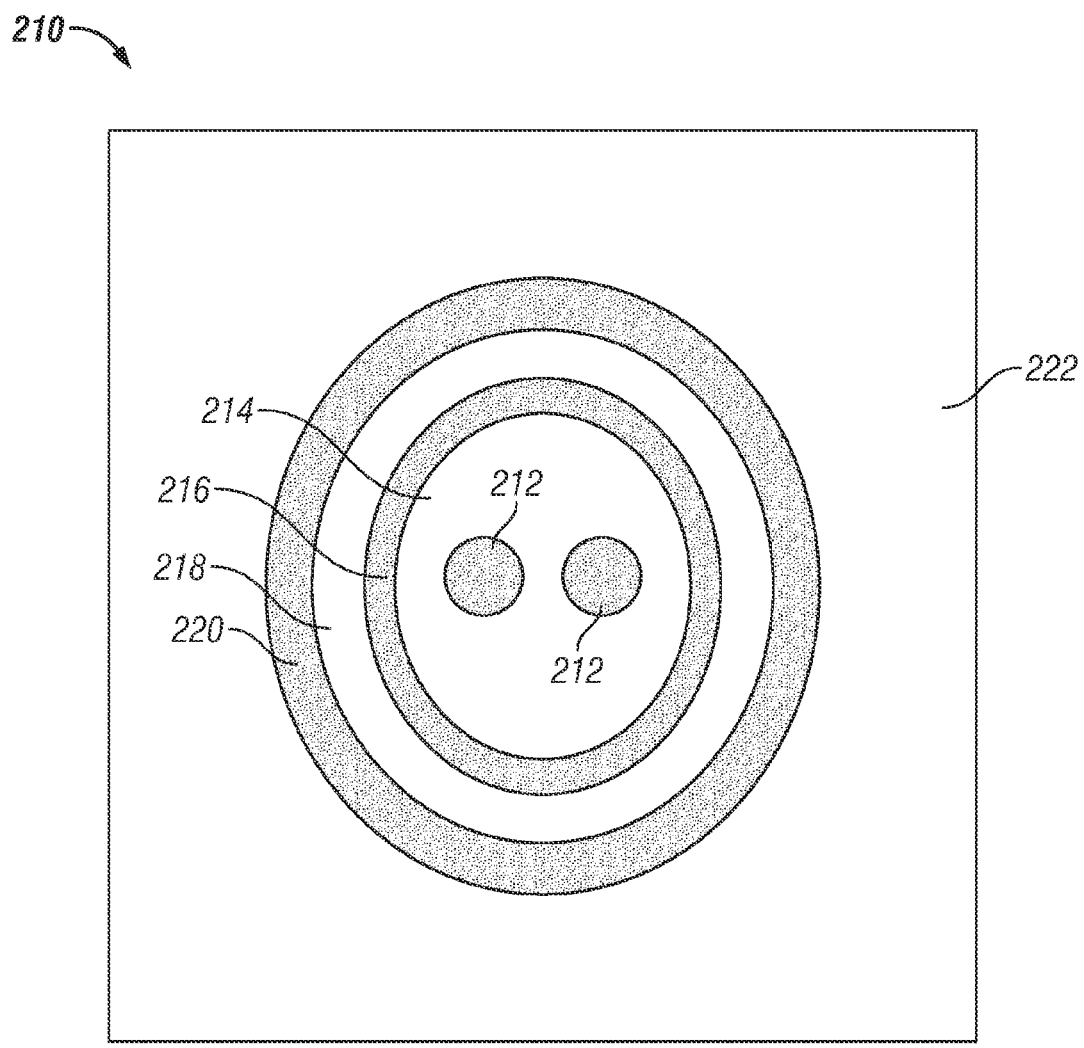

FIG. 2B shows a cross-section of an alternate fiber optic cable embodiment. Fiber optic cable 210 includes an inner tube 216 having an interior region 214 through which one or more optical fibers 212 are provided. The inner tube 216 can be encapsulated by an outer tube 220 wherein a jacket is disposed in the annular region between inner tube 216 and outer tube 220. An outer encapsulation may maintain the outer tube 220 to provide the fiber optic cable 210.

In wellbore operations, fiber optic cables are typically used in environments in which the temperature exceeds a service temperature of a cable-filling gel. Various gels used in fiber optic cables (and their corresponding flashpoints) include: Hubert Group's LA1000 (flash point=260° C.), Master Gel R1849 (flash point=246° C.), Master Gel R-1865 (flash point=250° C.), Unigel OPGW-400H (flash point=220° C.), and SEPIGEL® (flash point=150° C.). Silicone based gels, such as SS-55L (flash point=315° C.) and CS-16 (flash point=315° C.) from Silicone Solutions, are also suitable as cable-filling compounds. A flashpoint of a material is a temperature above which the material can be made to ignite in air. A chemical change typically occurs when a gel transitions through its flashpoint. Volatile components of the gel burn off, leaving behind a solid silica-based material when cooled to room temperature. The modulus of the material resulting from the gel transitioning through its flashpoint increases with a decrease in temperature and therefore causes microbending losses which lead to an increase in signal attenuation. Prior art fiber optic cables thus cannot operate above the flashpoint of its gel composition without reducing its ability to provide strong optical signals. In addition, prior art manufacturing processes of fiber optic cables are typically performed in an uncontrolled environment in which residual air is trapped in the interior region 204. Humidity and oxygen in the trapped air enable oxidization and degradation of the gel at excess temperatures, thereby limiting the maximum operating temperature of the gel. Thus, gels are often limited in their downhole use. SS-55L, for example has a maximum service temperature of 204° C. and a flashpoint of 315° C. Typical downhole temperatures can range anywhere from room temperature to 300° C. and above.

Figure 3A:
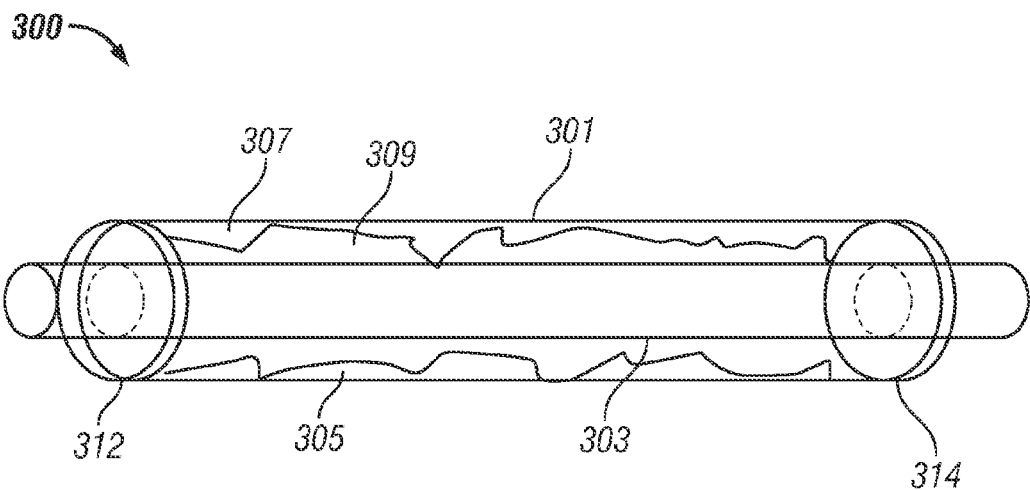
FIG. 3A shows an exemplary embodiment of a fiber optic cable of the present disclosure.

FIG. 3 shows an exemplary fiber optic cable 300 of the present disclosure. The fiber optic cable includes a tube 301 and an optical fiber 303 therein. An interior region 305 between the optical fiber 303 and the tube 301 is filled with thixotropic gel 307 and an inert or mostly inert gas 309. Typical inert gases used in the exemplary fiber optic cable include Argon (Ar) and Helium (He), for example. A typical mostly inert gas can include Nitrogen ($N_2$), for example. In an exemplary method of constructing fiber optic cable 300, optical fiber 303 is disposed in the tube 301. Interior region 305 is filled with an inert gas 309 or mostly inert gas and thixotropic gel 307 is provided in the interior region having the inert or mostly inert gas therein. The gel displaced a selected volume of the gas to achieve a selected volumetric ratio of gas to gel. Seals 312 and 314 are provided at each end to seal the interior region 305 from an outside environment including air, thereby sealing the gel and the inert gas and/or mostly inert gas within the interior region. Various thixotropic gels can be used, including the exemplary gels disclosed above. A volumetric ratio of inert gas to thixotropic gel can be selected by an operator to compensate for the thermal expansion of the gel in the metal tube.

As discussed above, a flashpoint of a material is a temperature above which the material can be made to ignite in air. Although the cable gel typically losses its thixotropic qualities, in an inert gas environment, the gel can maintain its thixotropic qualities at temperatures above its maximum service temperature and below its flashpoint. As a result, a fiber optic cable composed of the gel and an inert gas in its interior region can be operated at temperatures above the maximum service temperature and below the flashpoint of the gel without losing signal quality.

Figure 3B:
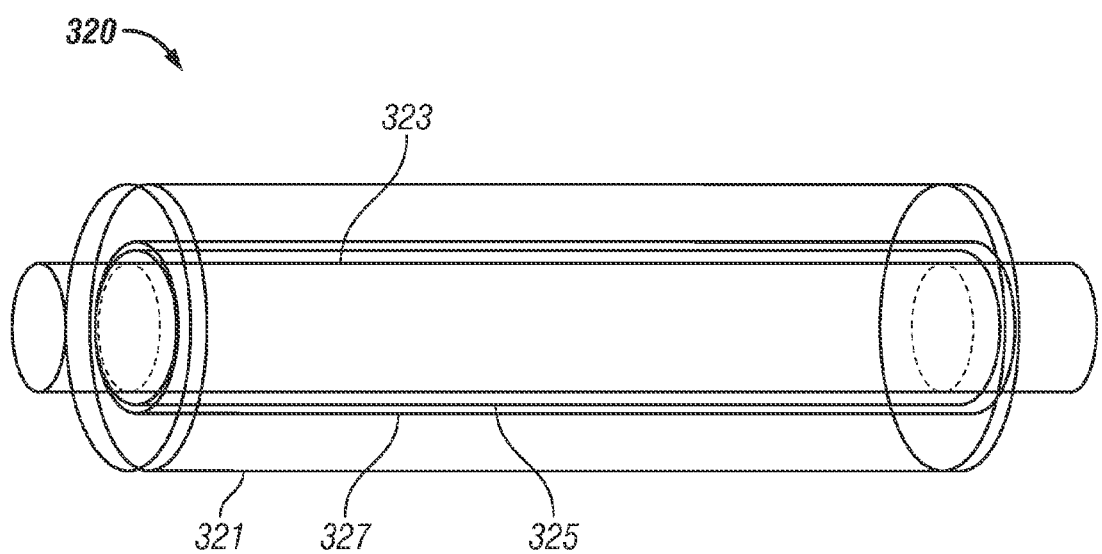
FIG. 3B shows an alternate embodiment of the fiber optic cable of the present disclosure.

FIG. 3B shows an alternate embodiment of the fiber optic cable of the present disclosure. The alternate fiber optic cable 320 includes optical fiber 323 disposed in a tube 321. The optical fiber 323 has two coatings of a polyimide materials or one fully cured polyimide material. The first coating 325 is a polyimide having a lower glass transition temperature than the second polyimide outer coating. The exemplary fiber optic cable 320 does not have a gel filling an interior region of tube 321. However, the fully cured polyimide coating or high glass transition outer polyimide coating do not stick to the tube wall and provide slip between the optical fiber and the tube.

Figure 6:
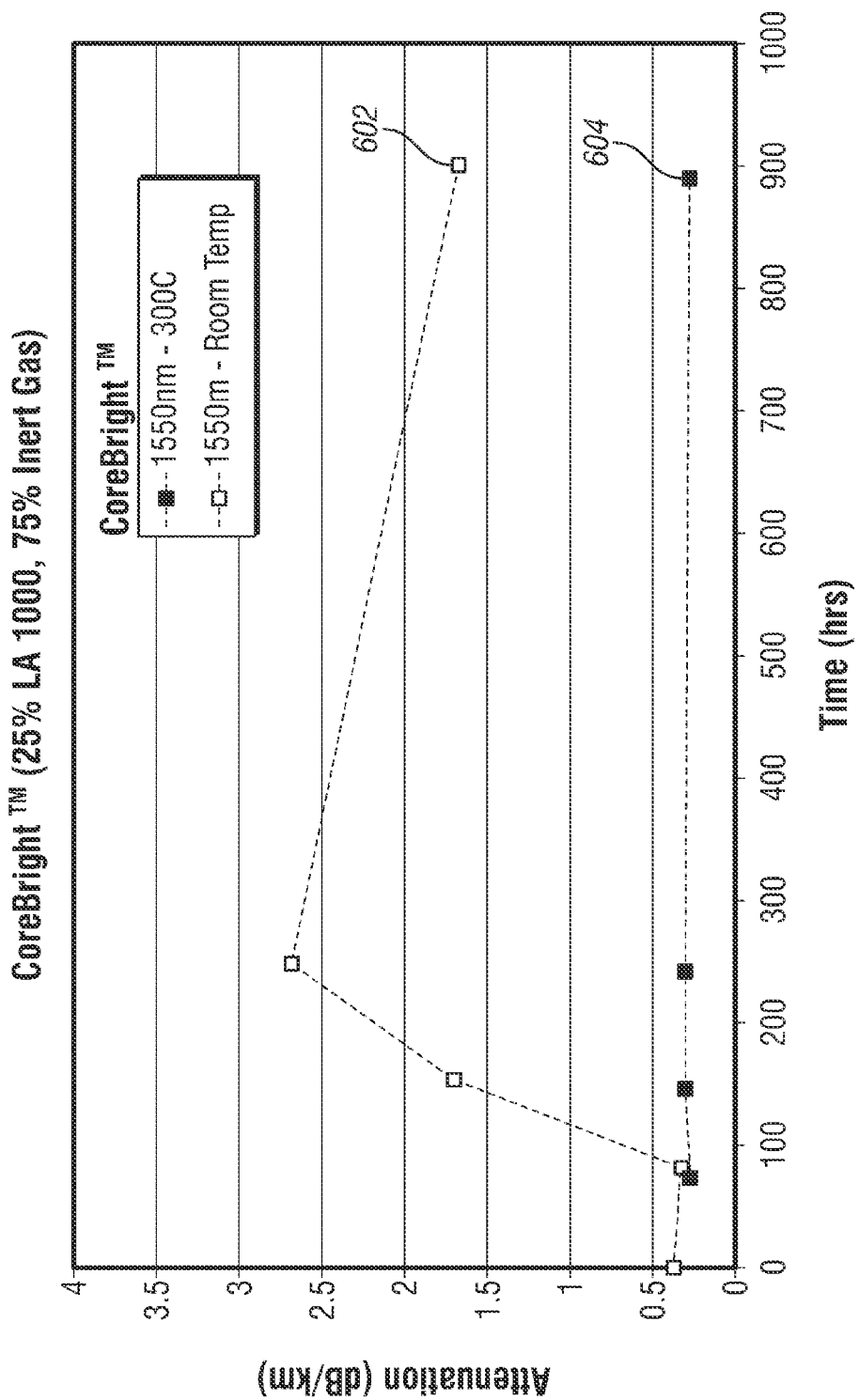
FIG. 6 shows a graph of signal attenuation over time for an exemplary fiber optic cable constructed as in FIG. 3A and having an interior region 25% filled with a LA1000 gel.
Figure 7:
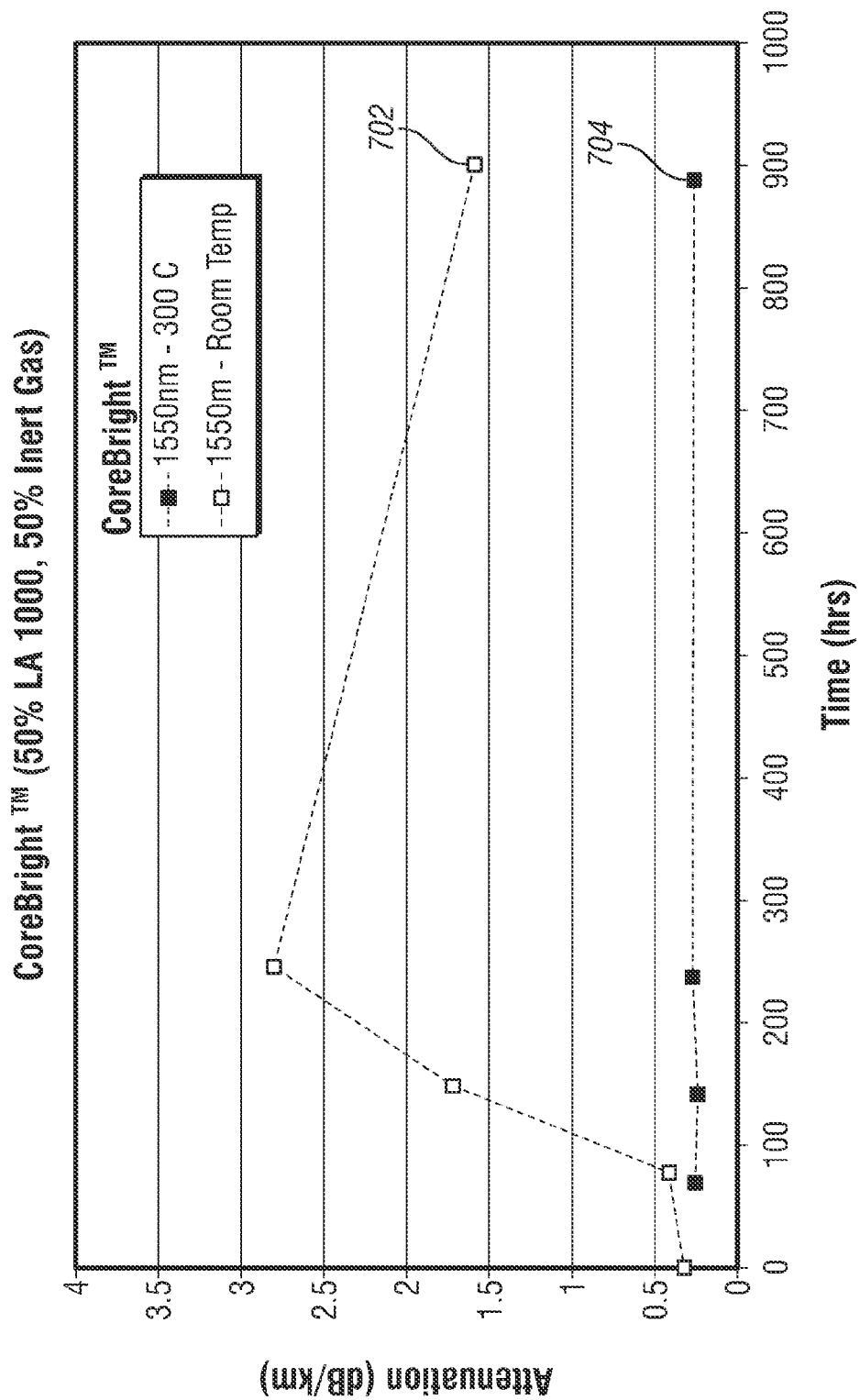
FIG. 7 shows a graph of signal attenuation over time for an exemplary fiber optic cable constructed as in FIG. 3A and having an interior region 50% filled with a LA1000 gel.
Figure 8:
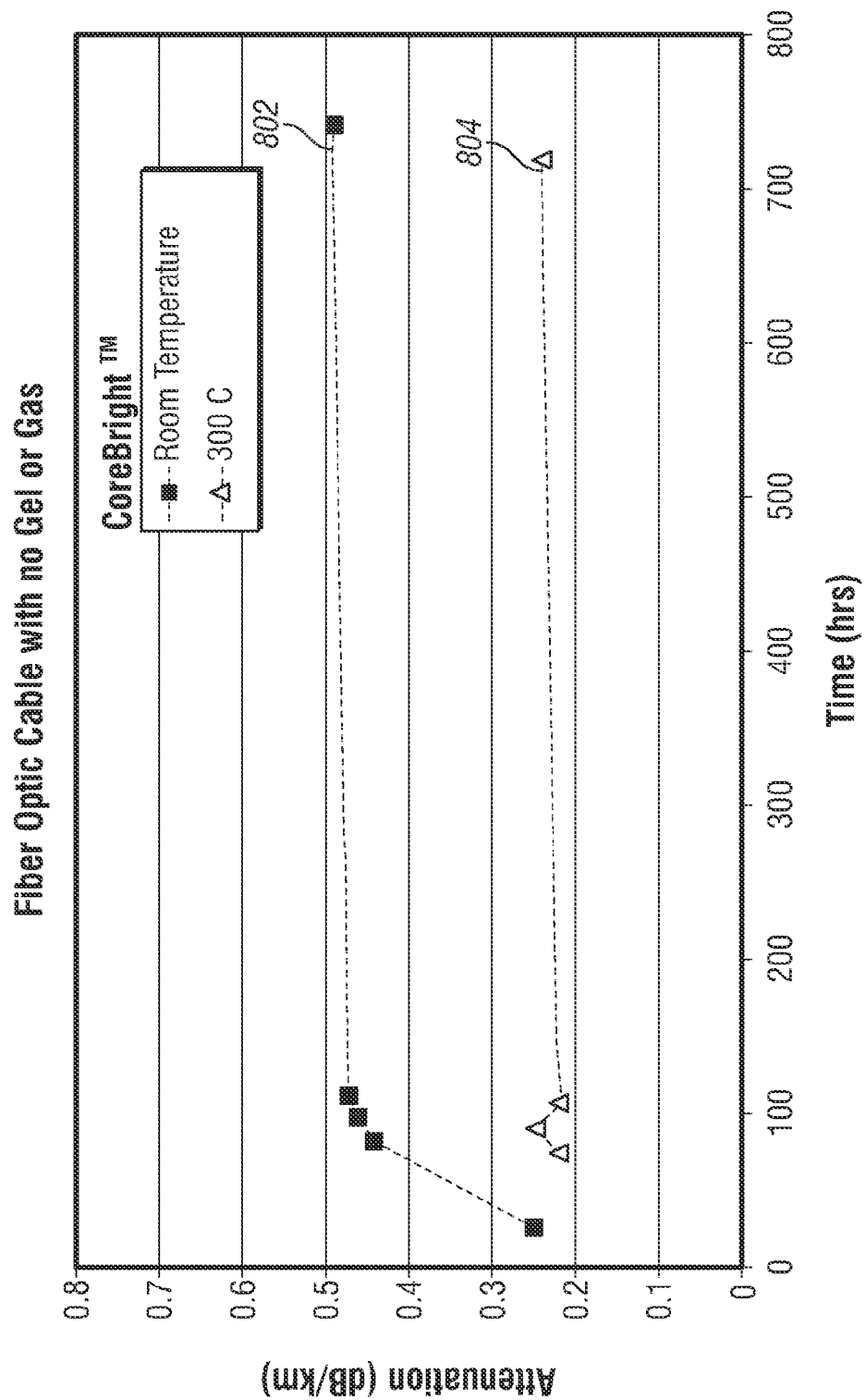
FIG. 8 shows a graph of signal attenuation over time for an exemplary fiber optic cable constructed as shown in FIG. 3B.

FIGS. 4-8 show attenuation graphs for various embodiments of the present invention. FIG. 4-7 show graphs of signal attenuation over time for an exemplary fiber optic cable constructed according to the method described with respect to FIG. 3A. FIG. 8 shows a graph of signal attenuation over time for an exemplary fiber optic cable constructed according to the method described with respect to FIG. 3B.

Figure 4:
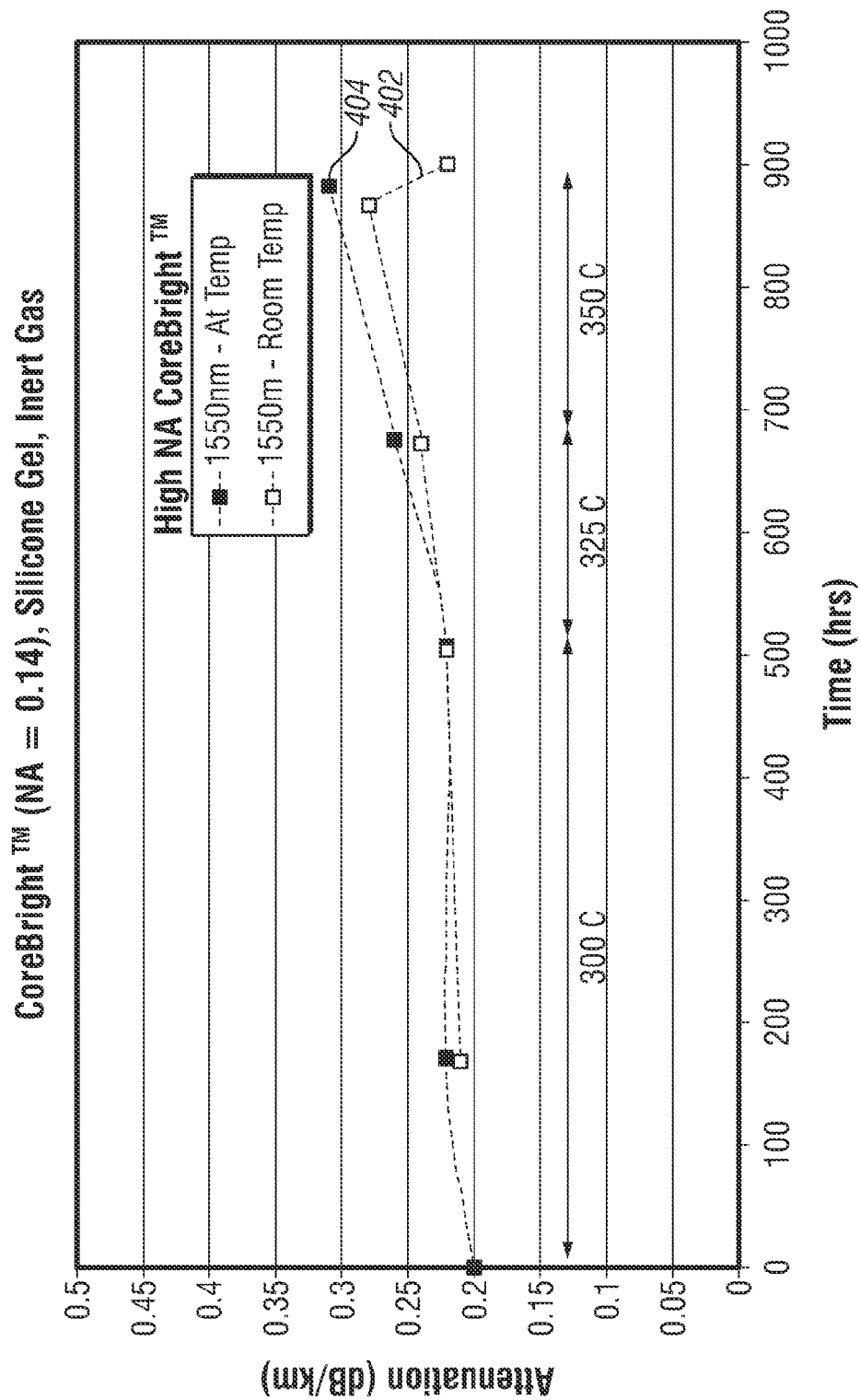
FIGS. 4 and 5 show graphs of signal attenuation over time for an exemplary fiber optic cable constructed as in FIG. 3A and including a composed of a silicone gel and inert gas in an interior region of the fiber optic cable.

FIG. 4 shows a graph of signal attenuation over time for a fiber optic cable including a CoreBright™ optical fiber having a numerical aperture NA=0.14. Interior region 305 is filled with a silicone gel and inert gas. Attenuation in graph 400 is along the y-axis in dB/km and time is along the x-axis in hours. The fiber optic cable is cycled between a room temperature and various elevated temperatures. During a time interval from 0 hours to about 500 hours, the fiber optic cable is cycled between room temperature and 300° C. During a time interval from about 500 hours to about 675 hours, the fiber optic cable is cycled between room temperature and 325° C. During a time interval from about 675 hours to about 900 hours, the fiber optic cable is cycled between room temperature and 350° C. Room temperature attenuation curve 402 represents the attenuation of a 1550 nm signal propagating through the fiber at room temperature. Elevated temperature attenuation curve 404 represents the attenuation of a signal propagating through the fiber at the elevated temperatures of 300° C., 325° C. and 350° C.

During the first 500 hours (cycling to 300° C.), attenuation curve 402 is between about 0.2 dB/km and about 0.28 dB/km. During this same first 500 hours, attenuation curve 404 is between about 0.2 dB/km and about 0.22 dB/km and is therefore substantially the same as attenuation curve 402. From about 500 hours to about 675 hours (cycling to 325° C.), attenuation curve 404 is between about 0.22 dB/km and about 0.26 dB/km and is also substantially the same as attenuation curve 402 (about 0.22 dB/km to about 0.24 dB/km). Between about 675 hours and about 900 hours (cycling to 350° C.), attenuation curve 404 is between about 0.26 dB/km and about 0.31 dB/km and is also substantially the same as attenuation curve 402.

Figure 5:
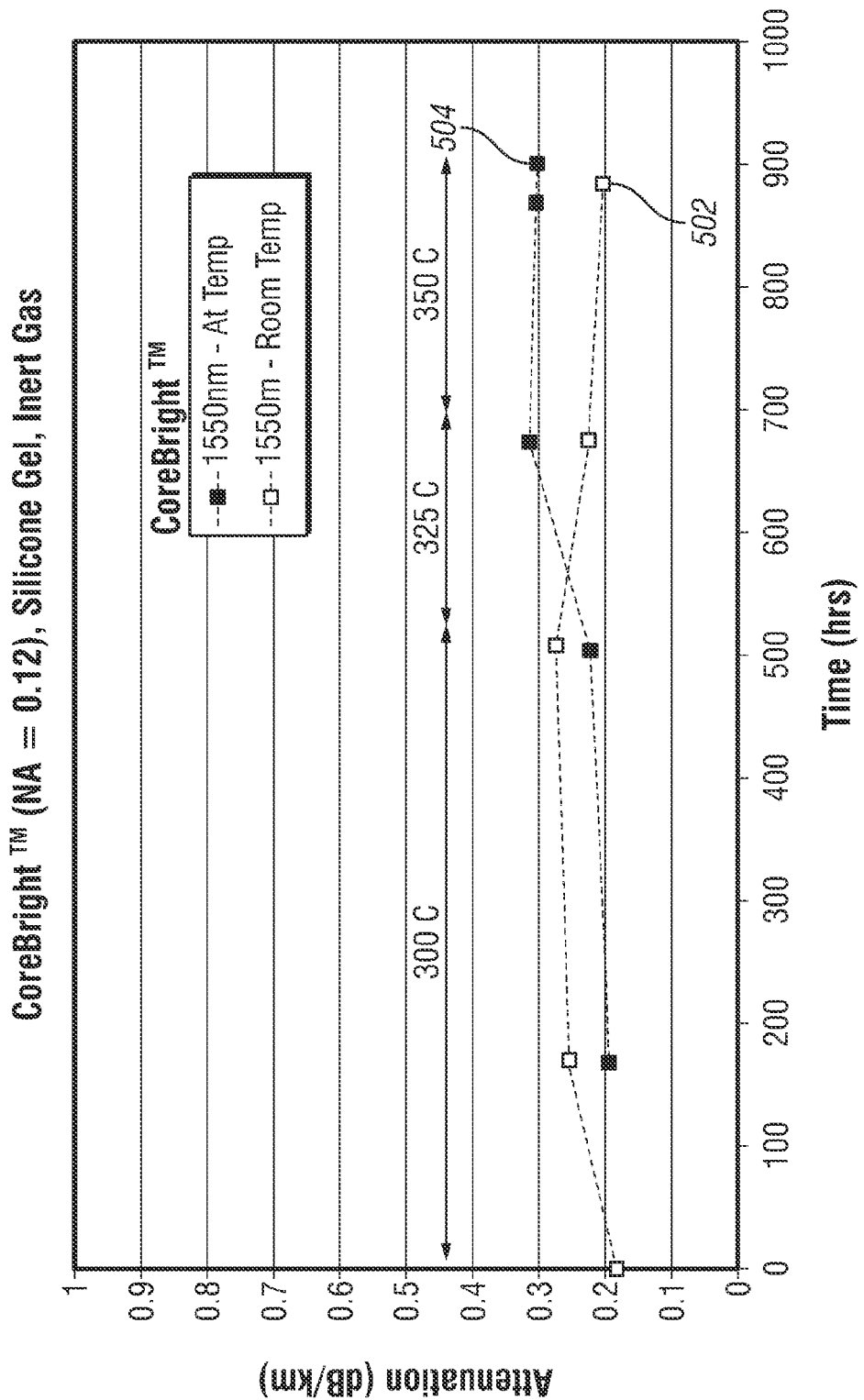

FIG. 5 shows a graph of signal attenuation over time for an exemplary fiber optic cable including a CoreBright™ optical fiber and an interior region filled with silicone gel and an inert gas. The optic fiber has a numerical aperture of NA=0.12. Attenuation is along the y-axis in dB/km and time is along the x-axis in hours. The fiber optic cable is cycled between a room temperature and respective temperatures of 300° C., 325° C. and 350° C. in the same manner as for the exemplary fiber optic cable of FIG. 4. Room temperature attenuation curve 502 represents the attenuation of a 1550 nm signal at room temperature and curve 504 represents the attenuation of a 1550 nm signal at the elevated temperatures of 300° C., 325° C. and 350° C.

During the first 500 hours (cycling to 300° C.), the attenuation curve 502 is between about 0.19 dB/km and about 0.24 dB/km, and the attenuation curve 504 is between about 0.19 dB/km and about 0.21 dB/km. Attenuation is therefore higher at room temperature than the attenuation at 300° C. during this time interval. From about 500 hours to about 675 hours (cycling to 325° C.), attenuation curve 504 is between about 0.21 dB/km and about 0.31 dB/km and attenuation curve 502 is about 0.21 dB/km to about 0.28 dB/km. From about 675 hours to about 900 hours (cycling to 350° C.), attenuation curve 504 is at about 0.30 dB/km the attenuation of curve 502 is at about 0.2 dB/km. Attenuation at 350° C. is therefore lower at the attenuation at room temperature during this time interval.

FIG. 6 shows a graph of signal attenuation over time for a standard fiber optic cable with a CoreBright™ optical fiber wherein the volume of the interior region is 25% filled with a gel, such as LA1000 and the remaining volume is filled with an inert gas. Attenuation is along the y-axis in dB/km and time is along the x-axis in hours. The fiber optic cable is cycled between a room temperature and 300° C. for about 900 hours. The flashpoint of LA1000 is about 260° C. Therefore, the fiber optic cable is operated above the flashpoint of LA1000. Room temperature attenuation curve 602 represents the attenuation of a 1550 nm signal at room temperature and elevated temperature attenuation curve 604 represents the attenuation of a 1550 nm signal at 300° C. Attenuation curve 604 remains at about 0.3 dB/km over the 900 hours therefore relatively low signal attenuation. In contrast, attenuation curve 602 rises to a maximum of about 2.7 dB/km, representing a high signal attenuation.

FIG. 7 shows a graph of signal attenuation over time for a standard fiber optic cable with a CoreBright™ optical fiber wherein the volume of the interior region is 50% filled with a gel, such as LA1000, and the remaining volume is filled with an inert gas. Attenuation is along the y-axis in dB/km and time is along the x-axis in hours. The fiber optic cable is cycled between a room temperature and 300° C. for about 900 hours. Curve 702 represents the attenuation of a signal at room temperature and curve 704 represents the attenuation of a signal at 300° C. Attenuation curves 702 and 704 show behavior similar to attenuation curves 602 and 604 of FIG. 6, respectively.

FIG. 8 shows a graph of signal attenuation over time for an exemplary fiber optic cable constructed as shown in FIG. 3B. Attenuation is along the y-axis in dB/km and time is along the x-axis in hours. The fiber optic cable is cycled between a room temperature and 300° C. for about 750 hours. Curve 802 represents the attenuation at room temperature and curve 804 represents the attenuation at the elevated temperatures of 300° C. Attenuation curve 802 is at about 0.42 dB/km and attenuation curve 804 is at about 0.24 dB/km. Therefore, signal attenuation lower at 300° C. than at room temperature.

Figure 9A:
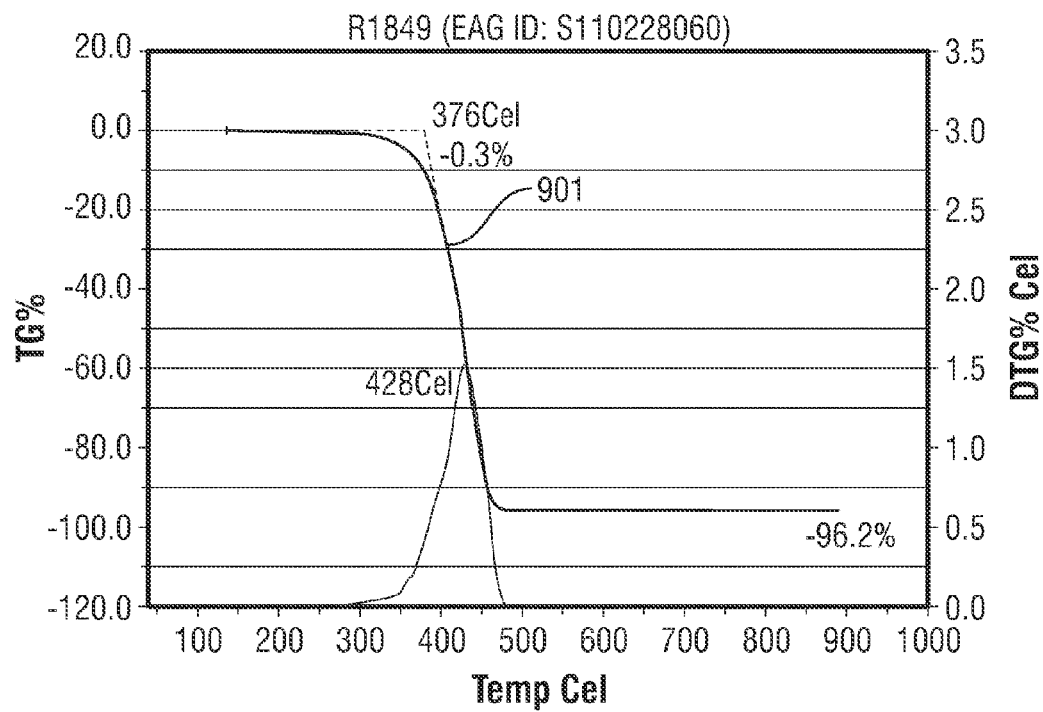
FIGS. 9A and 9B show mass loss curves for hydrocarbon gel R1849 in argon and air, respectively, in an the exemplary fiber optic cable of the present disclosure.
Figure 9B:
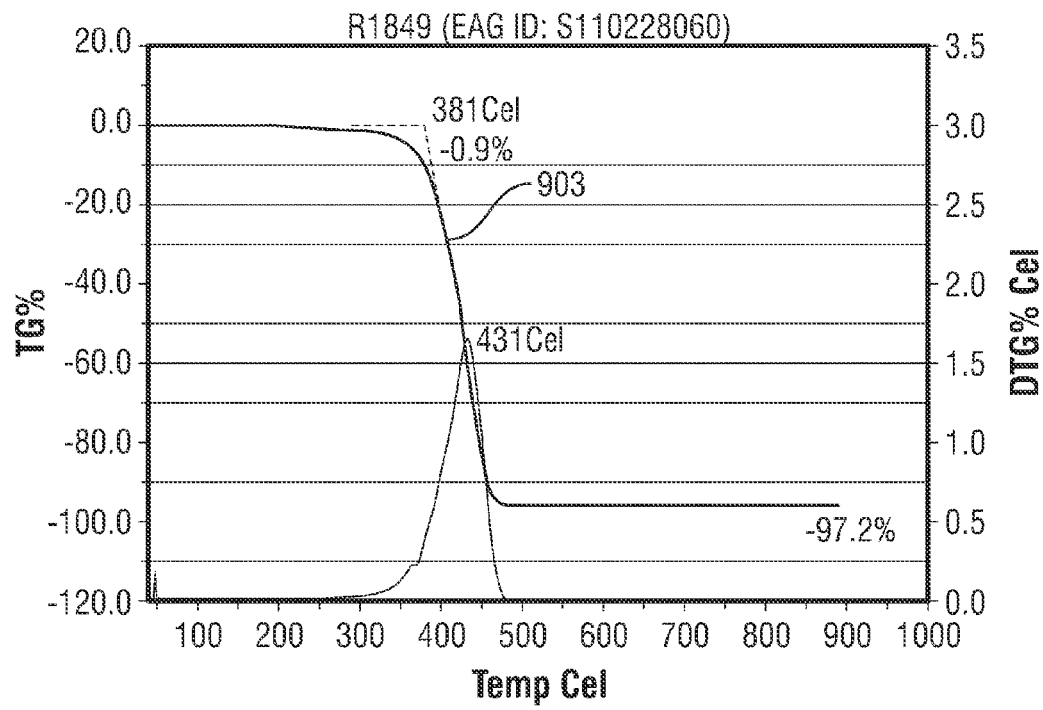

FIGS. 9A and 9B illustrate mass loss curves 901 and 903 with respect to temperature in argon and air atmosphere, respectively, for a hydrocarbon gel R1849, used as a gel in a fiber optic cable of the present disclosure. Mass loss % (TG %) is shown along the y-axis and temperature is shown along the x-axis. The mass loss curves are similar in both atmospheres. In Argon, the onset of mass loss occurs at a temperature between 375-380° C. and experiences a rapid mass loss at about 430° C. and ending at ~500° C. A final residue content of 3.8% wt. and 2.8% wt is found in argon and air atmosphere, respectively.

Figure 10A:
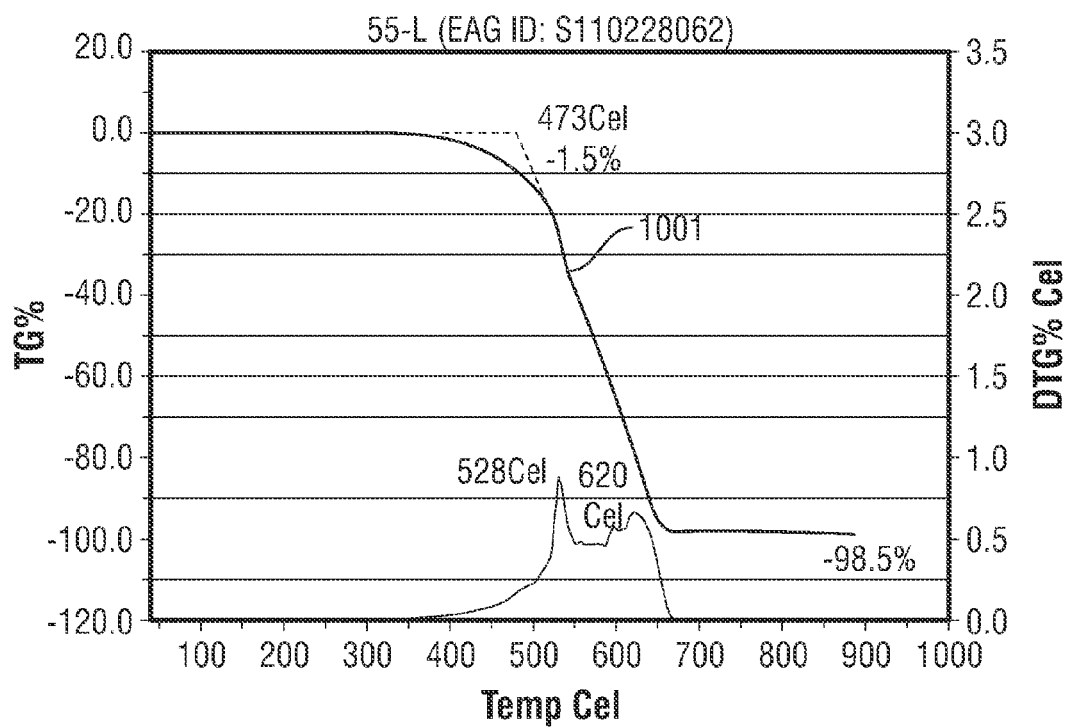
FIGS. 10A and 10B show mass loss curves for silicone gel 55-L in argon and air, respectively, in an exemplary fiber optic cable of the present disclosure.
Figure 10B:
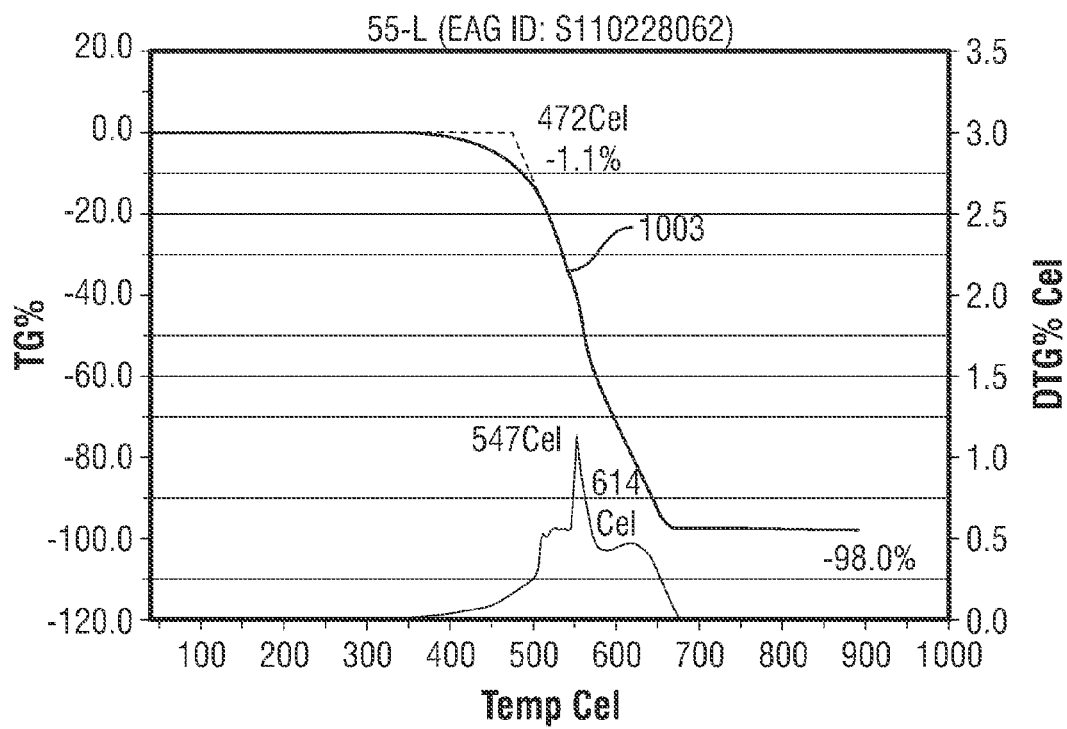

FIGS. 10A and 10B illustrate mass loss curves 1001 and 1003 with respect to temperature in argon and air atmosphere, respectively for silicone gel 55-L used as a gel in a fiber optic cable of the present disclosure. Compared to FIGS. 9A and 9B, silicone gel 55-L experiences mass loss at higher temperatures. Gel 55-L exhibits multi-stage mass loss patterns between 470° C. and 650° C. A final residue content of 1.5-2.0% wt. is found.

Therefore, in one aspect, the present disclosure provides a fiber optic cable including a tube having an interior region; an optical fiber disposed in the interior region of the tube; a gas in the interior region; and a gel in the interior region, wherein the gel is configured to reduce stress on the optical fiber in the presence of the gas at a temperature substantially near a flashpoint of the gel. The fiber optic cable can further includes one or more seals configured to seal the gel and the gas within the interior region. In various embodiments, the gel is thixotropic in the presence of at least one of an inert gas and a mostly inert gas at a temperature substantially near the flashpoint of the gel. The gel can be one of a hydrocarbon gel, a silicone gel, a fluoropolymer gel, a mineral oil, for example. In various embodiments, the gel reduces attenuation of a signal propagating along the optical fiber by reducing the stress on the optical fiber. The gas can be at least one of: (i) Argon; (ii) Helium; (iii) Nitrogen ($N_2$); and (iv) air. The fiber optic cable can be used to transmit a signal for one of: (i) Real-Time Compaction Monitoring (RTCM); (ii) Distributed Temperature Sensing (DTS); (iii) Optical Frequency Domain Reflectometry (OFDR); and (iv) Extrinsic Fabry-Perot Interferometry (EFPI). The fiber optic cable further can also be used in at least one of: (i) an oil exploration system; (ii) an oil production system; (iii) a measurement-while-drilling tool; (iv) a wireline logging device; and (v) a telemetry device. A ratio of gel to gas in the interior region can be in the range of 0%-100%.

In another aspect, the present disclosure provides a method of transmitting a signal in a downhole environment, the method including: providing a fiber optic cable formed by disposing an optical fiber in an interior region of a tube, providing a gas in the interior region, and providing a gel in the interior region to reduce stress on the optical fiber in the presence of the gas at a temperature substantially near a flashpoint of the gel; disposing the fiber optic cable in the downhole environment at a temperature greater than a service temperature of the gel; and transmitting the signal over the optical fiber. The stress on the optical fiber can be due to any of: a shear stress, thermal expansion of the metal tube; and cable manufacture, for example. The gas can be provided in the interior region to reduce oxidation of the gel. In one embodiment, the fiber optic cable can be operated above the flashpoint of the gel.

In another aspect, the present disclosure provides an apparatus for transmitting a signal in a downhole environment, the apparatus including: a fiber optic cable disposed in the downhole environment and including a tube having an interior region, an optical fiber disposed in the interior region of the tube, a gas in the interior region, and a gel in the interior region, the gel configured to reduce a stress on the optical fiber in the presence of the gas at a temperature substantially near a flashpoint of the gel; and a transmitter coupled to a first end of the fiber optic cable configured to transmit a signal into the optical fiber. The fiber optic cable further can include one or more seals configured to seal the gel and the gas within the interior region. The gel can be configured to reduce stress on the optical fiber to reduce a signal attenuation of the optical fiber. The gel can be a hydrocarbon gel, a silicone gel, a thixotropic gel, a fluoropolymer gel, or a mineral oil, for example. The gas can be at least one of: (i) Argon; (ii) Helium; (iii) Nitrogen ($N_2$); and (iv) air. The fiber optic cable can be used for Real-Time Compaction Monitoring (RTCM); Distributed Temperature Sensing (DTS); Optical Frequency Domain Reflectometry (OFDR); and Extrinsic Fabry-Perot Interferometry (EFPI), for example. The fiber optic cable can also be used in least one of: (i) an oil exploration system; (ii) an oil production system; (iii) a measurement-while-drilling tool; (iv) a wireline logging device; and (v) a telemetry device.

In another aspect, the present disclosure provides a method of producing a fiber optic cable for use in a downhole environment, the method including: providing a tube having an interior region; disposing an optical fiber in the interior region of the tube; filling the interior region with an inert gas; and displacing a selected volume of the inert gas from the interior region with a gel configured to reduce stress on the optical fiber in the presence of the inert gas at a temperature substantially near a flashpoint of the gel. The method further includes sealing the gel and the inert gas within the interior region.

In yet another aspect, the present disclosure provides a fiber optic cable for use in a downhole environment, including: a tube having an interior region; an optical fiber disposed in the interior region of the tube; an inert gas in the interior region configured to extend a lifetime of the optical fiber coating and/or optical fiber. The coating of the fiber can be at least one of: (1) polyimide; (2) acrylate; (3) silicone; (4) poly-amide; (5) fluoropolymer; (6) polyether ether ketone (PEEK); (7) metal; (8) carbon; and (9) ceramic. The cable can be encapsulated using at least one of: (1) plastic; (2) fluoropolymer; (3) metal; (4) wire; (5) glass; (6) gel; (7) liquid; and (8) gas.

While the foregoing disclosure is directed to the exemplary embodiments of the disclosure, various modifications will be apparent to those skilled in the art. It is intended that all variations within the scope and spirit of the appended claims be embraced by the foregoing disclosure.

What is claimed is:

1. A fiber optic cable, comprising:
a tube having an interior region;
an optical fiber disposed in the interior region of the tube;
a gas in the interior region; and
a gel in the interior region, wherein the gel is configured to reduce stress on the optical fiber in the presence of the gas at a downhole temperature substantially near a flashpoint of the gel.

2. The fiber optic cable of claim 1, further comprising one or more seals configured to seal the gel and the gas within the interior region.

3. The fiber optic cable of claim 1, wherein the gel is thixotropic in the presence of at least one of (i) an inert gas, and (ii) a mostly inert gas at a temperature substantially near the flashpoint of the gel.

4. The fiber optic cable of claim 3, wherein the gel is at least one of: (i) a hydrocarbon gel; (ii) a silicone gel; (iii) a fluoropolymer gel; and (iv) a mineral oil.

5. The fiber optic cable of claim 1, wherein the gel reduces stress on the optical fiber to reduce attenuation of a signal propagating along the optical fiber.

6. The fiber optic cable of claim 1, wherein the gas is at least one of: (i) Argon; (ii) Helium; (iii) Nitrogen ($N_2$); and (iv) air.

7. The fiber optic cable of claim 1, wherein use of the fiber optic cable further comprises transmitting a signal over the optical fiber for one of: (i) Real-Time Compaction Monitoring (RTCM); (ii) Distributed Temperature Sensing (DTS); (iii) Optical Frequency Domain Reflectometry (OFDR); and (iv) Extrinsic Fabry-Perot Interferometry (EFPI).

8. The fiber optic cable of claim 1, wherein use of the fiber optic cable further comprises using the fiber optic cable in at least one of: (i) an oil exploration system; (ii) an oil production system; (iii) a measurement-while-drilling tool; (iv) a wireline logging device; and (v) a telemetry device.

9. The fiber optic cable of claim 1, wherein a ratio of gel to gas in the interior region is selected to compensate for thermal expansion of the gel.

10. An apparatus for transmitting a signal in a downhole environment, comprising:
   a fiber optic cable disposed in the downhole environment including:
      a tube having an interior region,
      an optical fiber disposed in the interior region of the tube,
      a gas in the interior region, and
      a gel in the interior region, the gel configured to reduce a stress on the optical fiber in the presence of the gas at a downhole temperature that is substantially near a flashpoint of the gel; and
   a transmitter coupled to a first end of the fiber optic cable configured to transmit a signal into the optical fiber.

11. The apparatus of claim 10, wherein the fiber optic cable further comprises one or more seals configured to seal the gel and the gas within the interior region.

12. The apparatus of claim 10, wherein the gel is configured to reduce stress on the optical fiber to reduce a signal attenuation of the optical fiber.

13. The apparatus of claim 10, wherein the gel is at least one of: (i) a hydrocarbon gel; (ii) a silicone gel; (iii) a thixotropic gel; (iv) a fluoropolymer gel; and (v) a mineral oil.

14. The apparatus of claim 10, wherein the gas is at least one of: (i) Argon; (ii) Helium; (iii) Nitrogen ($N_2$); and (iv) air.

15. The apparatus of claim 10, wherein the fiber optic cable is used for one of: (i) Real-Time Compaction Monitoring (RTCM); (ii) Distributed Temperature Sensing (DTS); (iii) Optical Frequency Domain Reflectometry (OFDR); and (iv) Extrinsic Fabry-Perot Interferometry (EFPI).

16. The apparatus of claim 10, wherein the fiber optic cable is used in least one of: (i) an oil exploration system; (ii) an oil production system; (iii) a measurement-while-drilling tool; (iv) a wireline logging device; and (v) a telemetry device.

17. A fiber optic cable for use in a downhole environment, comprising:
   a tube having an interior region;
   an optical fiber disposed in the interior region of the tube; and
   an inert gas in the interior region configured to extend a lifetime of the optical fiber coating and/or optical fiber in the downhole environment, wherein a temperature of the downhole environment is greater than a service temperature of the gel and less than a flashpoint of the gel.

18. The fiber optic cable of claim 17, where the coating of the fiber is at least one of: (1) polyimide; (2) acrylate; (3) silicone; (4) poly-amide; (5) fluoropolymer; (6) polyether ether ketone (PEEK); (7) metal; (8) carbon; and (9) ceramic.

19. The fiber optic cable of claim 18, where the cable is encapsulated with at least one of: (1) plastic; (2) fluoropolymer; (3) metal; (4) wire; (5) glass; (6) gel; (7) liquid; and (8) gas.

* * * * *